United States Patent
Zhang (10) Patent No.: US 11,617,475 B1
(45) Date of Patent: Apr. 4, 2023

(54) MULTIFUNCTIONAL KITCHEN UTENSIL MATCHED WITH ELECTRIC DRILL

(71) Applicant: SIW Technology Co., Ltd, Shenzhen (CN)

(72) Inventor: Xiaoya Zhang, Lanzhou (CN)

(73) Assignee: SIW Technology Co., Ltd, Shenzhen (CN)

( * ) Notice: Subject to any disclaimer, the term of this patent is extended or adjusted under 35 U.S.C. 154(b) by 0 days.

(21) Appl. No.: 17/830,370

(22) Filed: Jun. 2, 2022

(51) Int. Cl.
*A47J 43/25* (2006.01)
*A47J 43/04* (2006.01)
*A47J 44/00* (2006.01)

(52) U.S. Cl.
CPC .............. *A47J 43/25* (2013.01); *A47J 43/04* (2013.01); *A47J 44/00* (2013.01)

(58) Field of Classification Search
CPC . A47J 43/04; A47J 43/25; A47J 44/00; B02C 19/08; B02C 1/04; B02C 1/14
USPC .................................................. 241/83, 270
See application file for complete search history.

(56) References Cited

U.S. PATENT DOCUMENTS 3,761,026 A * 9/1973 Rohmer ................. B02C 18/24
241/199.12

FOREIGN PATENT DOCUMENTS

| CN | 205994367 U | 3/2017 |
| CN | 111531598 A | 8/2020 |
| CN | 213155547 U | 5/2021 |
| CN | 215226993 U | 12/2021 |
| DE | 659122 | * 9/1938 |

* cited by examiner

*Primary Examiner* — Shelley M Self
*Assistant Examiner* — Smith Oberto Bapthelus
(74) *Attorney, Agent, or Firm* — Nitin Kaushik (57) ABSTRACT

The present disclosure discloses a multifunctional kitchen utensil matched with an electric drill. The multifunctional kitchen utensil matched with the electric drill comprises a grating board, an inner container and an outer container; the grating board and the bottom of the inner container are detachably connected; and the inner container is placed inside the outer container. The outer container is used for placing fruits and vegetables to be grated, and the inner container is used for placing the grated filamentous fruits and vegetables. The grating board is connected to the bottom of the inner container. The present disclosure avoids the dangerous situation that an operator needs to hold the fruits and vegetables to be grated with a hand during grating, and solves the problems of inconvenient collection of the grated filamentous fruits and vegetables and the single function of the grater.

9 Claims, 8 Drawing Sheets

MULTIFUNCTIONAL KITCHEN UTENSIL MATCHED WITH ELECTRIC DRILL

TECHNICAL FIELD

The present disclosure relates to the field of metal kitchenware, and particularly relates to a multifunctional kitchen utensil matched with the electric drill.

BACKGROUND

A grater is a kitchen utensil for grating food ingredients, and is generally of a single structure. People often place a support under the grater so as to take filamentous food ingredients.

In daily life, when an existing grater is in use, fruits and vegetables need to be held with a hand for grating, the operator's hand is easy to scratch, and the existing grater is inconvenient to use. The existing grater also has the problem that grated products are difficult to collect, which causes the grating process to be difficult. In addition, there are many existing kitchen utensils, and the existing multifunctional kitchen utensils matched with the electric drills have a single function and are easily in idle for a long time.

Therefore, the problems that the grated products are difficult to collect and the grater has a single function need to be solved urgently.

SUMMARY

In view of this, the main purpose of the present disclosure is to provide a safe and easy-to-operate multifunctional kitchen utensil matched with an electric drill.

In order to achieve the above purpose, the technical solution of the present disclosure is realized in this way:

A multifunctional kitchen utensil matched with an electric drill, comprising: a grating board (1), an inner container (2) and an outer container (3), wherein the grating board and the bottom of the inner container (2) are detachably connected; and the inner container (2) is placed inside the outer container (3).

Further, wherein the grating board (1) comprises an assembly plate (11) and filament guide plates (12), and the filament guide plate (12) and the assembly plate t 11) are connected in a snap-fit manner;

Further, the assembly plate (It) comprises a first rectangular opening (111), a first clamping slot (112), a second clamping slot (113), and fixed blocks (114); the first rectangular opening (111) is formed in the radius direction of the assembly plate (11); the first clamping slot (112) and the second clamping slot (113) are formed in the two sides of the first rectangular opening (111);

Further, two or more than two fixed blocks (114) are arranged on the sides of the assembly plate (11), and hemispherical grooves (1141) are arranged on the two sides of the fixed block (114);

the filament guide plate (12) comprises a grating knife (121), a fixed frame (122), a first fastener (123) and a second fastener (124), the grating knife (121) and the fixed frame (122) are fixedly connected, and the two ends of the fixed frame (122) are respectively integrally formed with the first fastener (123) and the second fastener (124); and at least one grating hole is formed in the grating knife (121).

Further, wherein the inner container (2) comprises a clamping table (21), a connecting column (22), an inner container body (23), and limited blocks (24);

the connecting column (22) is fixedly connected to the central position of the upward side of the inner container body (23), the clamping table (21) is arranged around the connecting column (22), and the limited blocks (24) are fixedly connected to the sides of the inner container body (23);

the number of the limited blocks (24) is two or more than two; the connecting column (22) is detachably connected to a drill chuck of the electric drill; and the clamping table (21) and the connecting column (22) are arranged in the shape of a prism.

Further, wherein two or more than two fastener slots (25) are formed in the lower part of the inner container body (23), and protrusions (251) are respectively arranged at the two sides of the fastener slot.

Further, wherein the outer container (3) comprises an outer container body (31) and limited tables (33);

the limited tables (33) are integrally formed on the upper side of the outer container body (31), and the outer container (3) is provided with an upper opening; and the inner space of the outer container (3) is cylindrical, and the exterior of the outer container is prismatic;

a second rectangular opening (34) is formed in the lower side of the outer container (3); and an object fixing tray (4) is arranged at the bottom of the outer container (3), the object fixing tray (4) is a pull-out type object fixing tray (4), and at least one pointed protrusion (43) or prismatic protrusion (44) is arranged on the upper surface of the object fixing tray (4).

Further, wherein the object fixing tray (4) comprises a circular plate (41), a baffle plate (42) and two anti-skid blocks;

and the circular plate (41) is fixedly connected to the baffle plate (42), and the anti-skid blocks are respectively arranged on the two ends of the outer side of the baffle plate (42).

Further, wherein the outer diameter of the inner container (2) is smaller than the inner diameter of the outer container (3).

Further comprising a fixed device (5), wherein the fixed device (5) comprises a fixing ring (51), a connecting rod (52), an adjusting plate (53) and an adjusting screw (54);

the fixing ring (51) is connected to the upper end of the connecting rod (52); the adjusting plate (53) is connected to the lower end of the connecting rod (52); adjusting holes are formed in the adjusting plate (53), and the adjusting screw is movably connected to the adjusting plate (53) through the adjusting holes;

a backing plate (55) is integrally formed in the bottom of the fixing ring (51) and an annular groove (32) is annularly formed in the outer side of the outer container (3), and the annular groove (32) is matched with the fixing ring (51).

Further comprising a scaling cover (6), wherein the sealing cover (6) is connected to the outer side of the inner container (2) in a sliding manner;

the sealing cover (6) comprises a sealing ring (61) and sliding balls (62), the sealing cover (6) and the sliding balls (62) are integrally formed, and the sealing cover (6) is at least provided with two or more than two sliding balls (62);

the sealing cover (6) is made of flexible materials; and the outer container (3) further comprises a sliding groove (26), and the sliding groove (26) is matched with the sliding balls (62).

Further, wherein a connecting opening (221) is formed in the bottom of the connecting column (22), and the connecting opening (221) is detachably connected to a head of an electric mixer.

The multifunctional kitchen utensil matched with the electric drill has the following beneficial effects:

the multifunctional kitchen utensil matched with the electric drill comprises a grating board, an inner container and an outer container; the grating board and the bottom of the inner container are detachably connected; and the inner container is placed inside the outer container. The outer container is used for placing fruits and vegetables to be grated, and the inner container is used for placing the grated filamentous fruits and vegetables. The grating board is connected to the bottom of the inner container. The multifunctional kitchen utensil matched with the electric drill avoids the dangerous situation that an operator needs to hold the fruits and vegetables to be grated with a hand during grating, and solves the problem of inconvenient collection of the grated filamentous fruits and vegetables. The electric drill clamps a connecting column through a drill chuck, and drives the inner container to rotate downwards. At the same time, the inner container drives the grating board at the bottom of the inner container to rotate downwards in the outer container so as to complete the grating action of the grating board. The filamentous fruits and vegetables are collected inside the inner container. At the same time, the outer container with an upper opening is also easy to clean.

DETAILED DESCRIPTION OF THE EMBODIMENTS

The multifunctional kitchen utensil matched with the electric drill is further illustrated in detail hereafter in combination with the drawings and the embodiment of the present disclosure.

Figure 1:
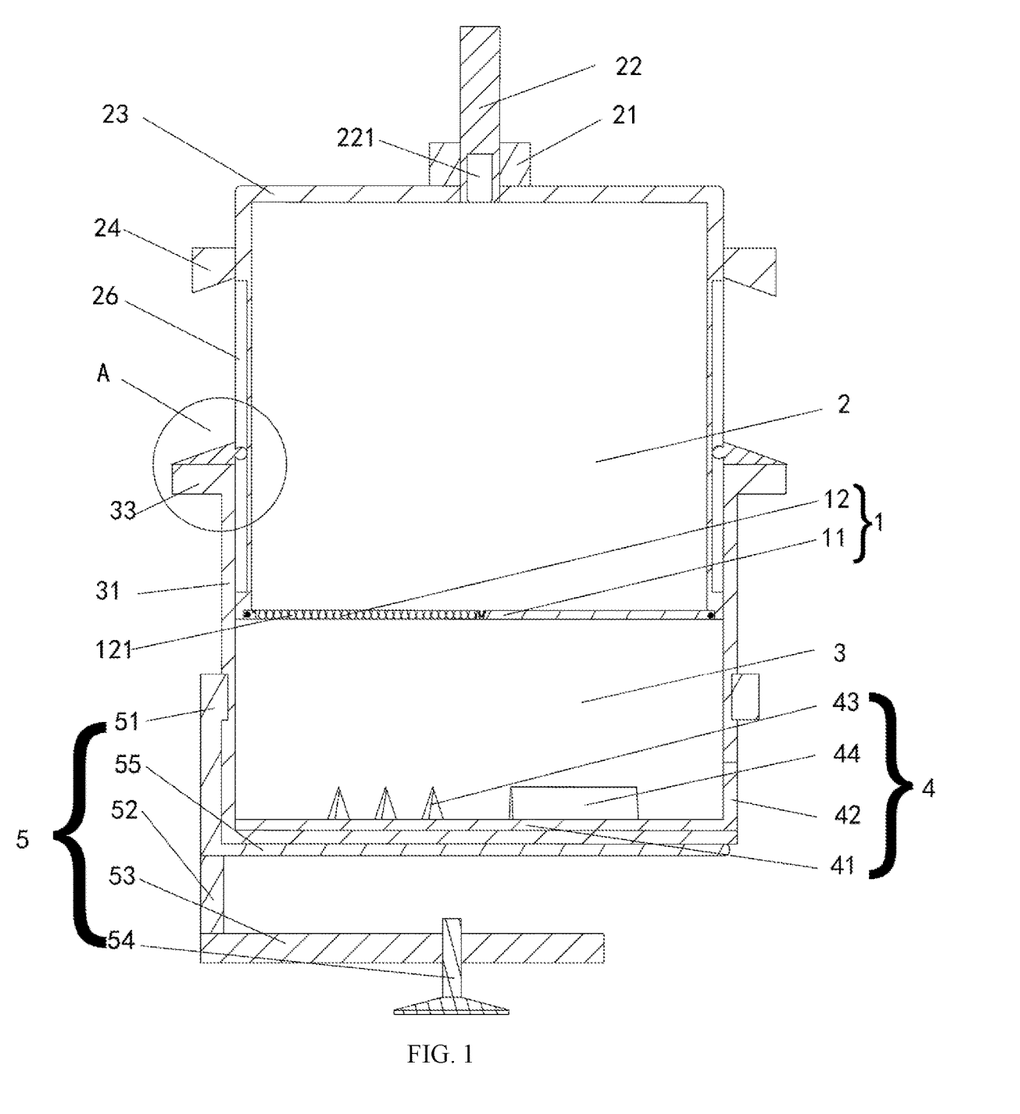
FIG. 1 is a sectional view of a multifunctional kitchen utensil matched with an electric drill disclosed according to the embodiment.
Figure 2:
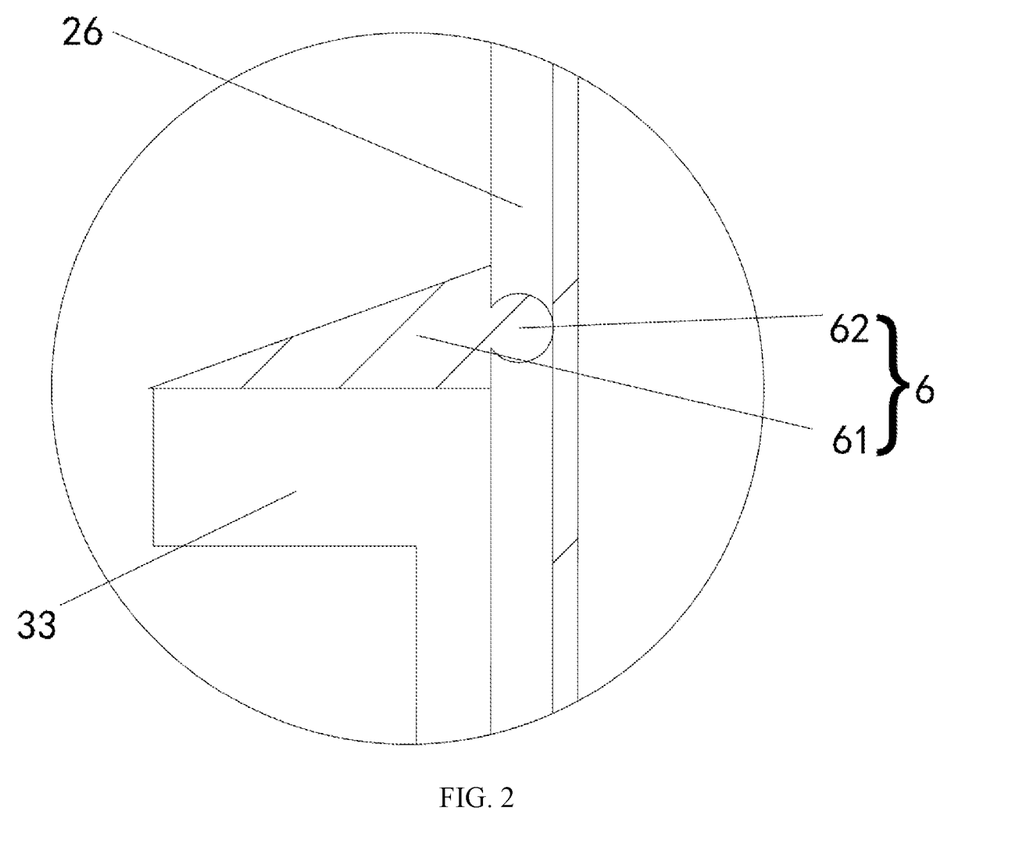
FIG. 2 is an enlarged view of a part A in FIG. 1 of the multifunctional kitchen utensil matched with the electric drill disclosed according to the embodiment.
Figure 3:
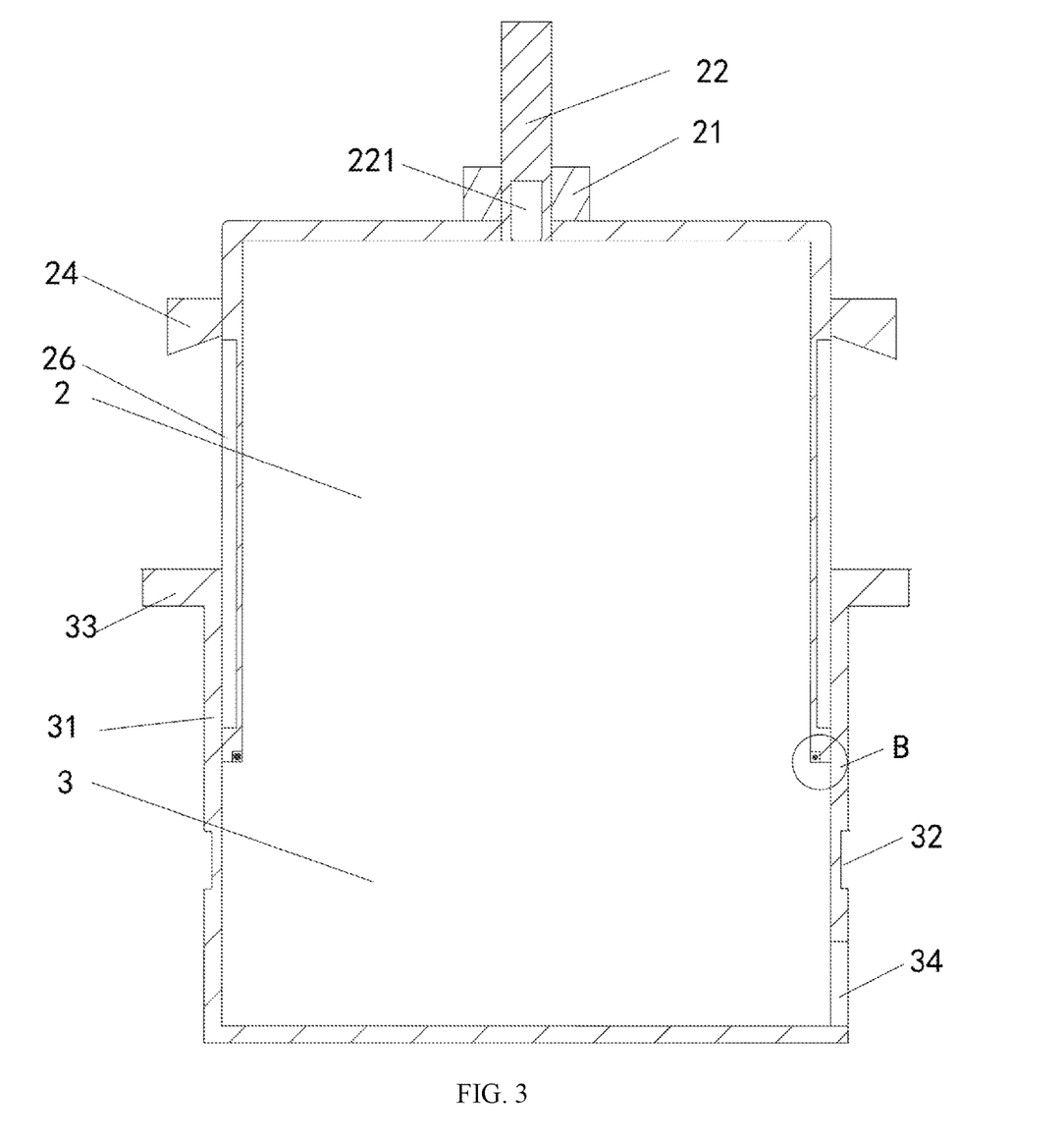
FIG. 3 is a sectional view of an outer container and an inner container of the multifunctional kitchen utensil matched with the electric drill disclosed according to the embodiment.
Figure 4:
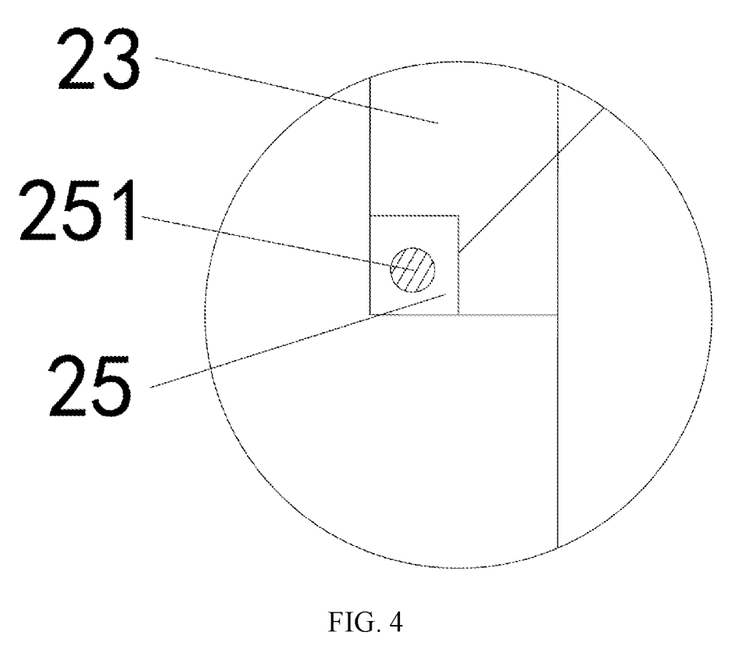
FIG. 4 is a sectional view of a part B in FIG. 3 of the multifunctional kitchen utensil matched with the electric drill disclosed according to the embodiment.
Figure 5:
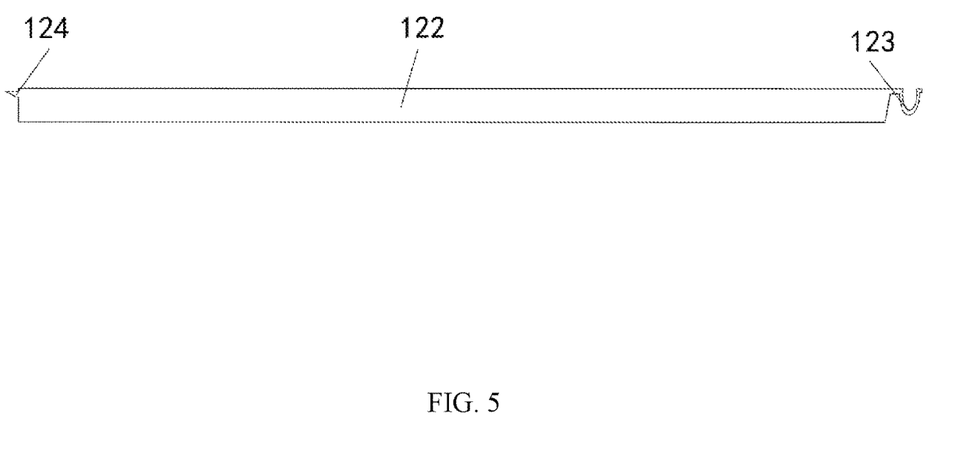
FIG. 5 is a structural schematic diagram of a filament guide plate of the multifunctional kitchen utensil matched with the electric drill disclosed according to the embodiment.
Figure 6:
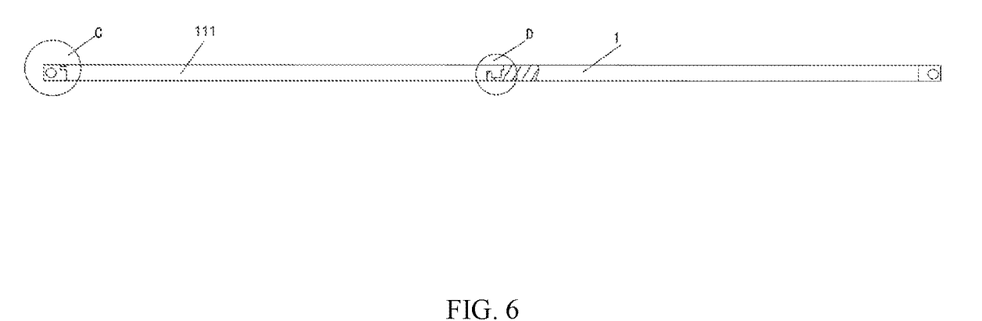
FIG. 6 is a structural schematic diagram of an assembly plate of the multifunctional kitchen utensil matched with the electric drill disclosed according to the embodiment.
Figure 7:
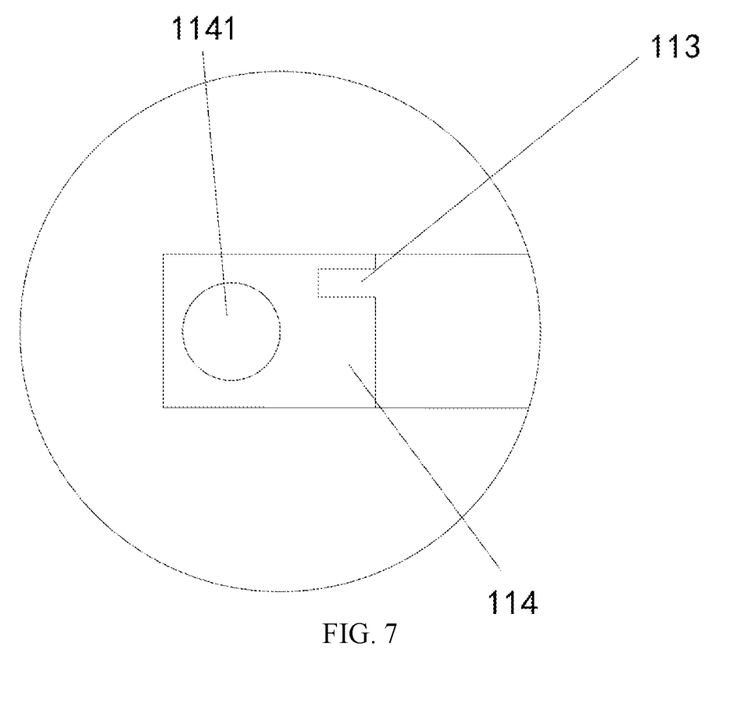
FIG. 7 is an enlarged view of a part C in FIG. 6 of the multifunctional kitchen utensil matched with the electric drill disclosed according to the embodiment.
Figure 8:
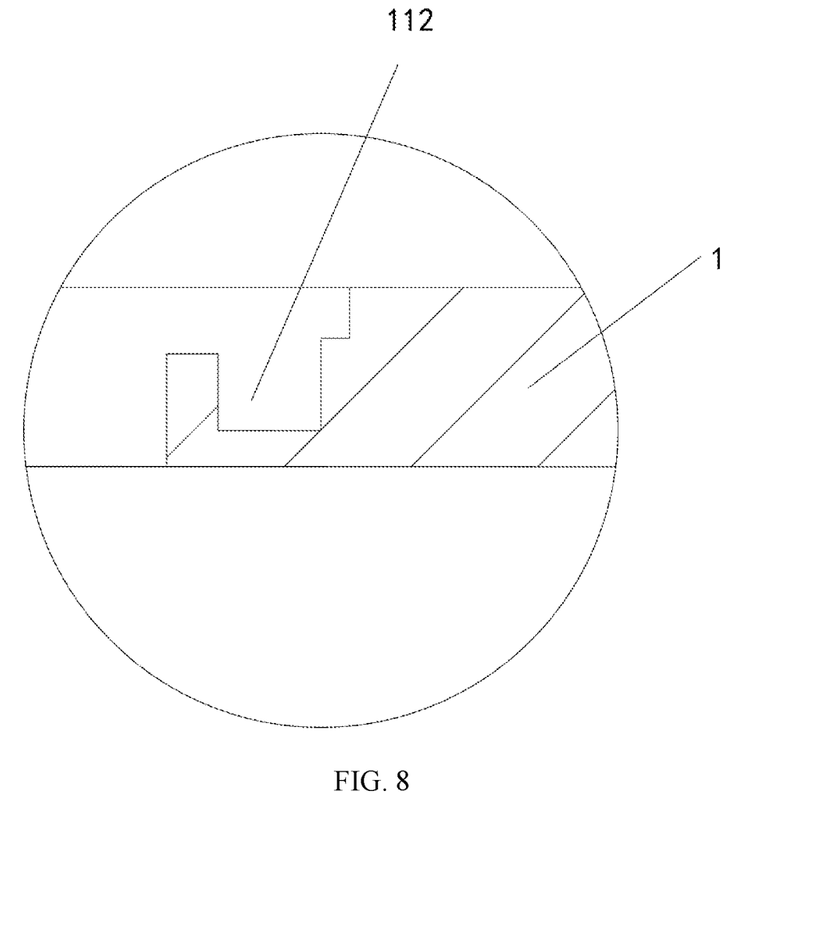
FIG. 8 is an enlarged view of a part D in FIG. 6 of the multifunctional kitchen utensil matched with the electric drill disclosed according to the embodiment.

The present disclosure is aimed at solving safety problems existing in the use of an existing grater. As shown in FIG. 1 to FIG. 8, the multifunctional kitchen utensil matched with the electric drill comprises a grating board 1, an inner container 2 and an outer container 3; the grating board and the bottom of the inner container 2 are detachably connected; and the inner container 2 is placed inside the outer container 3. The outer container 3 is used for placing fruits and vegetables to be grated, and the inner container 2 is used for placing the grated filamentous fruits and vegetables. The grating board 1 is connected to the bottom of the inner container 2. The multifunctional kitchen utensil matched with the electric drill avoids the dangerous situation that an operator needs to hold the fruits and vegetables to be grated with a hand during grating, and solves the problem of inconvenient collection of the grated filamentous fruits and vegetables. The electric drill clamps a connecting column 22 through a drill chuck, and drives the inner container 2 to rotate downwards. At the same time, the inner container 2 drives the grating board 1 at the bottom of the inner container 2 to rotate downwards in the outer container 3 so as to complete the grating action of the grating board 1. The filamentous fruits and vegetables are collected inside the inner container 2.

In order to facilitate the replacement of filament guide plates 12 with different grating sizes, the multifunctional property of the multifunctional kitchen utensil matched with the electric drill has been realized. The grating board 1 comprises an assembly plate 11 and the filament guide plates 12, and the filament guide plate 12 and the assembly plate 11 are connected in a snap-fit manner, and the assembly plate 11 and the filament guide plate 12 are detachably connected, which facilitates the replacement of the filament guide plate 12 and the cleaning work after use.

In order to facilitate the collection of grated filamentous fruit and vegetable products, the inner container 2 and the grating board 1 are detachably connected to jointly create a space for collecting the filamentous products. In order to facilitate the replacement of the filament guide plates 12, the assembly plate 11 comprises a first rectangular opening 111, a first clamping slot 112, a second clamping slot 113, and fixed blocks 114; and the first rectangular opening is formed in the radius direction of the assembly plate 11, and the first clamping slot 112 and the second clamping slot 113 are formed in the two sides of the first rectangular opening.

The first rectangular opening 111 and the filament guide plate 12 are detachably connected together by the first clamping slot 112 and the second clamping slot 113, which not only realizes a replaceable function, but also facilitates the cleaning of the interior of the container after the multifunctional kitchen utensil matched with the electric drill is used.

In order to meet the requirement for connection strength at the high rotating speed of the electric drill after the grating board 1 is connected to the inner container 2, two or more than two fixed blocks 114 are arranged on the sides of the assembly plate 11, and hemispherical grooves 1141 are formed the two sides of the fixed block 114. Preferably, the assembly plate 11 is provided with the two fixed blocks 114, and the two fixed blocks 114 are symmetrically arranged to ensure the stability of connection between the grating board 1 and the inner container 2 in a horizontal direction. Preferably, the assembly plate 11 should be uniformly provided with the fixed blocks 114. The hemispherical grooves 1141 formed in the sides of the fixed block 114 ensure the stability of connection between the grating board 1 and the inner container in a vertical direction. As the grating board 1 is arranged at the bottom of the inner container 2, the grating board 1 easily falls under the condition that there is no barrier, and the grating board 1 and the inner container 2 can be firmly connected in a snap-fit manner through cooperation of the hemispherical grooves 1141 here with protrusions at the bottom of the inner container 2.

In order to enable a grating knife 121 to completely grate products, the filament guide plate 12 comprises the grating knife 121, a fixed frame 122, a first fastener 123 and a second fastener 124, the grating knife 121 and the fixed frame 122 are fixedly connected, and the two ends of the fixed frame 122 are integrally formed with the first fastener 123 and the second fastener 124 respectively; and at least one grating hole is formed in the grating knife 121. The surface of fruits and vegetables first contacts the grating knife 121, and the filamentous products obtained by grating with the grating knife 121 are guided into the inner container 2 through the filament guide plate 12 which is inclined upwards. Then, the upper part of the fruits and vegetables is grated into the filamentous fruits and vegetables by the grating board 1 layer by layer. Due to the downward applied force of the inner container and the gradually thinning fruits and vegetables, the inner container 2 moves downward. The grating work is finished until a limited plate of the grating board 1 touches the bottom of the inner container 2. The first fastener 123 and the second fastener 124 are in clamping connection with the first clamping slot and the second clamping slot in the assembly plate 11 in a matching manner to achieve the effect of detachable connection between the filament guide plate 12 and the assembly plate.

In order to enable the electric drill to be firmly connected to the inner container 2 and transmit the rotary force of the electric drill to the grating board 1, the inner container 2 comprises a clamping table 21, a connecting column 22, an inner container body 23, and limited blocks 24; the connecting column 22 is fixedly connected to the central position of the upward side of the inner container body 23, the clamping table 21 is arranged around the connecting column 22, and the limited blocks 24 are fixedly connected to the sides of the inner container body (23); the number of the limited blocks 24 is two or more than two; the connecting column 22 is detachably connected to the drill chuck of the electric drill; and the clamping table 21 and the connecting column 22 are arranged in the shape of a prism. The clamping table 21 is fixedly connected to the center of the upward side of the top of the inner container 2; and the clamping table 21 assists the clamping of the drill chuck and the connecting column 22. The connecting column 22 is fixedly connected to the center of the upper part of the clamping table 21; and the connecting column 22 is generally made of a metal material. The connecting column 22 and the drill chuck of the electric drill are detachably connected. The connecting column 22 and the drill chuck play the role of connecting the electric drill and the grating board 1. The clamping table 21 and the connecting column 22 are both arranged in the shape of a prism; and a prismatic shape has greater resistance than a cylindrical shape, which ensures that the drill chuck and the connecting column 22 are relatively stable.

In order to ensure the stable connection between the grating board 1 and the inner container, two or more than two fastener slots 25 are formed in the lower part of the inner container body 23, and protrusions 251 are respectively arranged at the two sides of the fastener slot 25. The protrusions 251 are matched with the hemispherical grooves in the fixed blocks 114 of the grating board 1

In order to facilitate the cleaning of the container and the cooperation between the inner container 2 and the outer container 3, the outer container 3 is provided with an upper opening. The outer container 3 comprises an outer container body 31 and a limited table 33; the limited table 33 is integrally formed on the upper side of the outer container body 31, and the outer container 3 is provided with the upper opening; the inner space of the outer container 3 is cylindrical, and the exterior of the outer container 3 is prismatic; and the container with the upper opening is easy to clean, and the difficulty for the operator to clean the utensil is reduced. The inner space of the outer container 3 is cylindrical, and the outer container 3 is in the shape of a prism as a whole; and the cylindrical interior facilitates the rotation of the inner container 2 in the outer container 3. The edges of the outer prism of the outer container 3 are rounded, so that even if the operator holds the exterior of the outer container 3 with the hand, the hand of the operator is not hurt by the outer edges. The multifunctional kitchen utensil matched with the electric drill not only increases safety factors during operation, but also improves the operating comfort level of the operator.

In order to facilitate the assembly of an object fixing tray 4 to improve the grating effect of the multifunctional kitchen utensil matched with the electric drill and to facilitate cleaning of the object fixing tray 4, a second rectangular opening 34 is formed in the lower side of the outer container 3. The second rectangular opening 34 is used for pulling the object fixing tray 4, and the length of the second rectangular opening 34 is equal to or greater than half of the circumference of the outer container 3. The object fixing tray 4 is arranged at the bottom of the outer container 3, and the object fixing tray 4 is a pull-out object fixing tray 4. As the surface of the object fixing tray 4 is uneven, the object fixing tray 4 fixed at the bottom of the outer container 3 also has the effect of fixing an object to be grated. However, when the object fixing tray fixed at the bottom of the outer container 3 is cleaned, a cleaning person is likely to be injured, the object fixing tray is not easy to clean, bacteria easily breeds and hygienic hidden danger exists. The defects and problems can be solved by using the pull-out object fixing tray 4. The individual object fixing tray 4 is easy to clean and drain, and the dry utensil is less prone to bacteria growth.

In order to facilitate the pulling operation of the object fixing tray 4, the object fixing tray 4 comprises a circular plate 41, a baffle plate 42 and two anti-skid blocks. The upper surface of the circular plate 41 here is rough, which improves the effect of fixing the object to be grated. The baffle 42 is matched with the second rectangular opening 34. The edge of the circular plate 41 is fixedly connected to the bottom of the baffle plate 42, and the anti-skid blocks are respectively arranged on the two ends of the outer side of the baffle plate 42. The baffle plate 42 is arranged above the circulate plate 41.

In order to increase the resistance of the object fixing tray 4 to the object to be grated and to better fix the object to be grated, at least one pointed protrusion 43 or prismatic protrusion 44 is arranged on the upper surface of the object fixing plate 4. The more the pointed protrusions 43 and prismatic protrusions 44 are provided, the better the fixing effect is, and the less the pointed protrusions 43 and prismatic protrusions 44 are provided, the poorer the fixing effect is. According to the needs of different fruits and vegetables, different amounts of the pointed protrusions 43 and prismatic protrusions 44 can be produced on demand.

In order to facilitate the downward movement of the grating board 1 in the outer container 3, preferably, the outer diameter of the inner container 2 is smaller than the inner diameter of the outer container 3.

In order to avoid the condition that the outer container 3 and the inner container 2 cannot relatively rotate during operation, the multifunctional kitchen utensil matched with the electric drill further comprises a fixed device 5, and the fixed device 5 comprises a fixing ring 51, a connecting rod 52, an adjusting plate 53 and an adjusting screw 54; the fixing ring 51 is connected to the upper end of the connecting rod 52, and the adjusting plate 53 is connected to the lower end of the connecting rod 52; adjusting holes are formed in the adjusting plate 53, and the adjusting screw is movably connected to the adjusting plate 53 through the adjusting holes; and a backing plate 55 is integrally formed in the bottom of the fixing ring 51. An annular groove 32 is annularly formed in the outer side of the outer container, and the annular groove 32 is matched with the fixing ring 51. The backing plate 55 is matched with the fixing ring 51, so that the outer container 3 does not move relative to the fixed device 5. The adjusting plate 53 and the backing plate 55 can clamp the edge of a table and the edge of the operating table. The distance between the backing plate 55 and the adjusting plate 53 is adjusted by the adjusting screw 54, so that the effect of clamping the operating table by the backing plate 55 and the adjusting plate 53 is achieved. The fixed device 5 does not move relative to the operating table, which ensures that the outer container 3 does not move relative to the operating table. Further, the inner container 2 drives the grating board 1 to rotationally move, and the object to be grated is fixed inside the outer container 3 by the fixed device 5, thereby achieving the effect of the grating board 1 performing a relative rotational motion relative to the object to be grated.

In order to prevent juice of fruits and vegetables from splashing out from the gap between the inner container 2 and the outer container 3 during operation, the multifunctional kitchen utensil matched with the electric drill further comprises a sealing cover 6, and the scaling cover 6 is connected to the outer side of the inner container 2 in a sliding manner; and the sealing cover 6 comprises a scaling ring 61 and sliding balls 62, the sealing cover 6 and the sliding balls 62 are integrally formed, and the sealing cover 6 is at least provided with the two or more than two sliding balls 62. Due to gravity, the sealing cover 6 moves downward as the inner container 2 goes deep into the interior of the outer container 3 to block splashes in the gap.

In order to buffer the impact force produced when the limited table 33 of the outer container 3 and the limited block 24 of the inner container 2 limit the inner container 2, the scaling cover 6 is made of a flexible material. The outer container 3 further comprises a sliding groove 26, and the sliding groove 26 is matched with the sliding balls 62. The flexible material not only buffers the impact force of the limited block 24, but also fits well with the edge of the outer container 3 to play a good sealing role.

In order to enrich the function of the multi-functional kitchen utensil matched with the electric drill to enable the multifunctional kitchen utensil matched with the electric drill to become a kitchen artifact, a connecting opening 221 is formed in the bottom of the connecting column 22, and the connecting opening 221 is detachably connected to a head of an electric mixer. The multi-functional kitchen utensil can not only be connected to the head of the electric mixer, but also can be connected to a rotating blade with a specific interface to achieve the effects of juicing, mincing meat, smashing garlic and the like.

The above description is only the preferred embodiments of the present disclosure and is not intended to limit the protection scope of the present disclosure.

What is claimed is:

1. A multifunctional kitchen utensil matched with an electric drill, comprising: a grating board (1), an inner container (2) and an outer container (3), wherein the grating board and the bottom of the inner container (2) are detachably connected; and the inner container (2) is placed inside the outer container (3);

the grating board (1) comprises an assembly plate (11) and filament guide plates (12), the filament guide plate (12) and the assembly plate (11) are connected in a snap-fit manner;

the assembly plate (11) comprises a first rectangular opening (111), a first clamping slot (112), a second clamping slot (113), and at least two limited blocks (114);

the first clamping slot (112) and the second clamping slot (113) are formed in the two sides of the first rectangular opening (111);

the at least two limited blocks (114) are arranged on the sides of the assembly plate (11), and hemispherical grooves (1141) are arranged on the two sides of the fixed block (114);

the filament guide plate (12) comprises a grating knife (121), a fixed frame (122), a first fastener (123) and a second fastener (124), the grating knife (121) and the fixed frame (122) are fixedly connected, and the two ends of the fixed frame (122) are respectively integrally formed with the first fastener (123) and the second fastener (124); and at least one grating hole is formed in the grating knife (121).

2. The multifunctional kitchen utensil matched with the electric drill according to claim 1, wherein the inner container (2) comprises a clamping table (21), a connecting column (22), an inner container body (23), and limited blocks (24);

the connecting column (22) is fixedly connected to the central position of the upward side of the inner container body (23), the clamping table (21) is arranged around the connecting column (22), and the at least two limited blocks (24) are fixedly connected to the sides of the inner container body (23);

the connecting column (22) is detachably connected to a drill chuck of the electric drill; and the clamping table (21) and the connecting column (22) are arranged in the shape of a prism.

3. The multifunctional kitchen utensil matched with the electric drill according to claim 2, wherein at least two fastener slots (25) are formed in the lower part of the inner container body (23), and protrusions (251) are respectively arranged at the two sides of the at least two fastener slots (25).

4. The multifunctional kitchen utensil matched with the electric drill according to claim 2, wherein a connecting opening (221) is formed in the bottom of the connecting column (22), and the connecting opening (221) is detachably connected to a head of an electric mixer.

5. The multifunctional kitchen utensil matched with the electric drill according to claim 1, wherein the outer container (3) comprises an outer container body (31) and a plurality of limited tables (33);

the limited tables (33) are integrally formed on the upper side of the outer container body (31), and the outer container (3) is provided with an upper opening; and the inner space of the outer container (3) is cylindrical, and body of the outer container is prismatic;

a second rectangular opening (34) is formed in the lower side of the outer container (3); and an object fixing tray (4) is arranged at the bottom of the outer container (3), the object fixing tray (4) is a pull-out type object fixing tray (4), and at least one pointed protrusion (43) or prismatic protrusion (44) is arranged on the upper surface of the object fixing tray (4).

6. The multifunctional kitchen utensil matched with the electric drill according to claim 5, wherein the object fixing tray (4) comprises a circular plate (41), a baffle plate (42) and two anti-skid blocks;

and the circular plate (41) is fixedly connected to the baffle plate (42), and the anti-skid blocks are respectively arranged on the two ends of the outer side of the baffle plate (42).

7. The multifunctional kitchen utensil matched with the electric drill according to claim 1, wherein the inner container (2) is smaller than the outer container (3) to facilitate the downward movement of the grating board 1 in the outer container (3).

8. The multifunctional kitchen utensil matched with the electric drill according to claim 1, further comprising a fixed device (5), wherein the fixed device (5) comprises a fixing ring (51), a connecting rod (52), an adjusting plate (53) and an adjusting screw (54);

the fixing ring (51) is connected to the upper end of the connecting rod (52); the adjusting plate (53) is connected to the lower end of the connecting rod (52); adjusting holes are formed in the adjusting plate (53), and the adjusting screw is movably connected to the adjusting plate (53) through the adjusting holes;

a backing plate (55) is integrally formed in the bottom of the fixing ring (51) and an annular groove (32) is annularly formed in the outer side of the outer container (3), and the annular groove (32) is matched with the fixing ring (51).

9. The multifunctional kitchen utensil matched with the electric drill according to claim 1, further comprising a sealing cover (6), wherein the sealing cover (6) is connected to the outer side of the inner container (2) in a sliding manner;

the sealing cover (6) comprises a sealing ring (61) and sliding balls (62), the sealing cover (6) and the sliding balls (62) are integrally formed, and the sealing cover (6) is at least provided with at least two sliding balls (62);

the sealing cover (6) is made of flexible materials; and the outer container (3) further comprises a sliding groove (26), and the sliding groove (26) is matched with the sliding balls (62).

\* \* \* \* \*